Nov. 21, 1933.   P. A. WOOSTER ET AL   1,935,970
INDICATING MEANS
Filed Oct. 19, 1931
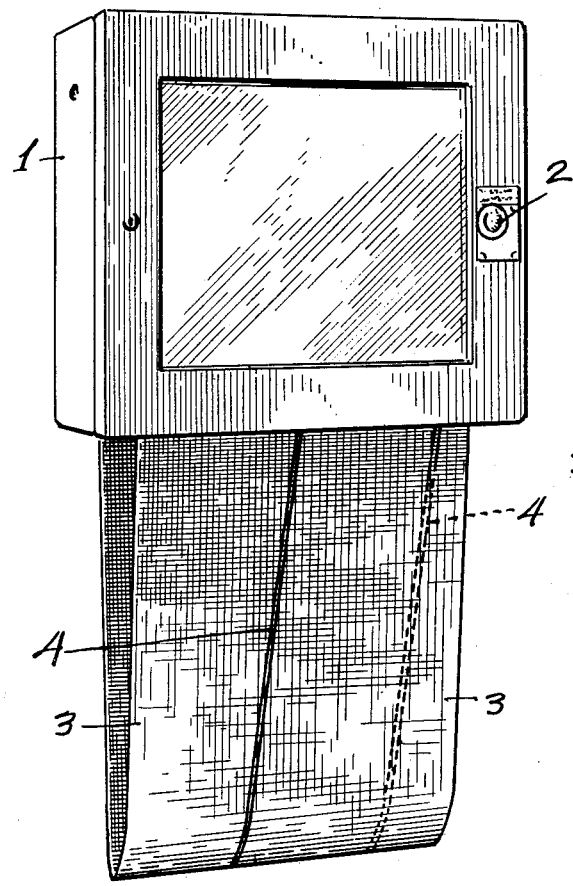
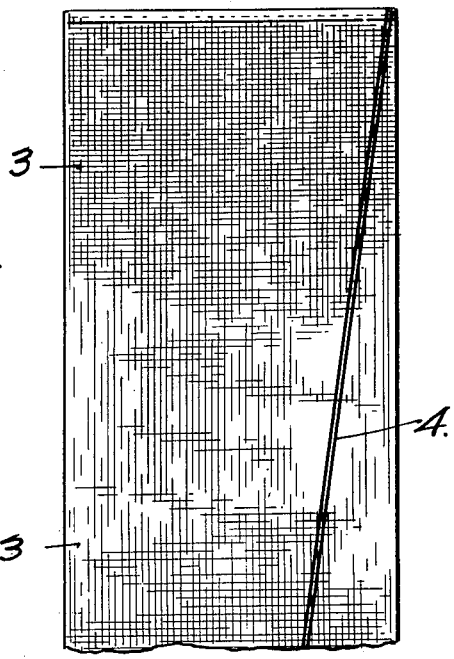
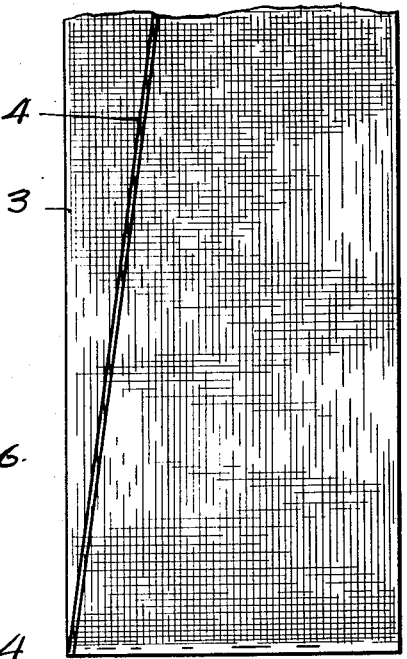
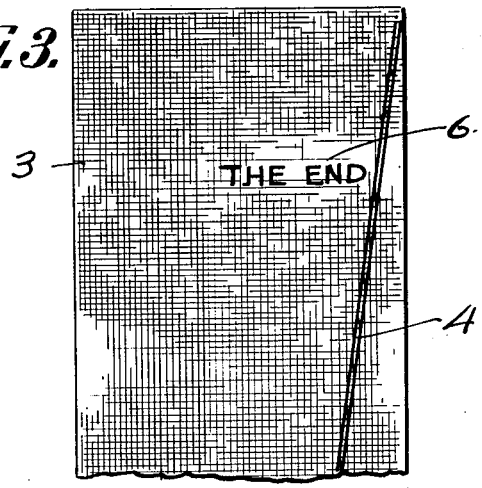
INVENTOR
PHILIP A. WOOSTER.
JOHN B. WOOSTER.
By Arthur L. Slee.
THEIR ATTORNEY.

Patented Nov. 21, 1933

1,935,970

UNITED STATES PATENT OFFICE 1,935,970

INDICATING MEANS

Philip A. Wooster and John B. Wooster, San Francisco, Calif.

Application October 19, 1931. Serial No. 569,746

4 Claims. (Cl. 116—114)

Our invention relates to improvements in indicia for indicating the remaining quantity of undispensed commodity within a dispensing cabinet, and particularly of the continuous type of dispensed commodity, such as a continuous towel being dispensed from a towel cabinet, wherein indicia, applied directly upon the commodity being dispensed, indicates, by its relative position, the quantity of undispensed commodity remaining within said cabinet.

The primary object of the present invention is to provide a new and improved indicating means, or indicia, for indicating the remaining or undispensed quantity of a commodity being dispensed.

Another object of the present invention is to provide new and improved indicia of the character set forth and for the purpose described, arranged to indicate the remaining quantity of undispensed commodity within a dispensing cabinet or device, whereby said quantity may be ascertained without opening said cabinet, for replenishment.

A further object is to provide a new and improved indicia of the character set forth, to indicate to users of the commodity, that the supply has become exhausted, thereby preventing possible damage to a dispensing device by continued efforts to secure further supply of said commodity, on the part of an operator.

We accomplish these and other objects by means of the improved device disclosed in the drawing forming a part of the present application wherein like characters of reference are used to designate similar parts throughout the specification and drawing, and in which—

Fig. 1 is a perspective view of one form of a dispensing device, disclosing our device applied thereto;

Fig. 2 is a broken elevation of one form of commodity removed from the dispensing device and disclosing one form of indicia applied thereto; and Fig. 3 is a broken view of a portion of one form of commodity disclosing a modified form of indicia applied thereto.

Referring to the drawing, the numeral 1 is used to designate, in general, one type of a dispensing device comprising the well known and established continuous towel cabinet from which, by pushing a button 2 thereon, mechanism, not shown, is operated which intermittently releases predetermined portions of a continuous towel 3 mounted within and having portions dispensed exteriorly of said cabinet 1.

In our invention, we have provided the towel 3 with indicia, preferably, in the form of a diagonally arranged bar 4, which may be sewed, printed, woven, or otherwise attached or mounted directly upon said towel 3 or the commodity being dispensed, so that the relative position of the exposed portion of the bar 4 will serve to indicate to operators, or persons employed to replenish said cabinet 1, the undispensed quantity of the towel 3 or other commodity, remaining within said cabinet.

The present method of supplying towels 3 for this established type of dispensing cabinet 1 is to so position the fastening mechanism, not shown, that the towels are always placed with the same side outwardly. Thus, in operation, when the releasing mechanism within the cabinet 1 is released to dispense a predetermined portion or length of towel only the operator or user pulls upon the exposed portion of the said towel 3.

As the towel 3 is thus dispensed it is obvious that the relative position of the diagonal bar 4 will be altered as the supply of continuous towel is used, and therefore, the bar or indicia 4 being diagonal, the relative position of the said indicia or bar 4 upon the exposed portion of the towel 3 will be altered, and thereby such relative position of said indicia will readily indicate to an operator, or person employed to replenish the same, the remaining or undispensed quantity of the commodity within the cabinet.

For instance, when the supply is approximately only half used the bar or indicia 4 will be relatively positioned upon the exposed or dispensed portion of the towel as disclosed in full lines in Fig. 1 of the drawing. When the supply has become exhausted, the bar or indicia 4 will be exposed or assume the relative position disclosed in dotted lines in said Fig. 1.

By the provision of this novel feature, possible injury to the towel, or the dispensing mechanism, or the cabinet itself, may be prevented as further efforts on the part of an operator to secure further commodity from an exhausted dispensing device will be prevented by indicating to said operator that said supply has become exhausted.

Also, a saving of time will be accomplished by persons employed to replenish the commodity, as the relative position of the indicia will indicate the quantity of the remaining undispensed portion of said commodity within the cabinet, or its complete exhaustion, without requiring the operation of opening said cabinet.

Further, the indicia herein described, will eliminate the necessity for the provision of expensive and complicated mechanism now employed for the same purpose, whereby a material saving in the expense of supplying or providing suitable indicia may be effected.

In Fig. 3 we have disclosed a slight modification of the form of indicia as disclosed at 6 in said Fig. 3, wherein the indicia may take the form of a direct announcement to inform uninitiated operators, or those of subnormal comprehension, that the supply of the commodity being dispensed has become exhausted.

Having thus described our invention what we claim as new and desire to secure by Letters Patent is—

1. The combination with a continuous towel dispensing cabinet, of a continuous towel mounted within said cabinet and extending exteriorly thereof and provided with a diagonally positioned index whereby the quantity of towel to be dispensed and remaining within said cabinet may be indicated by the position of the said diagonally positioned index visible exteriorly of said cabinet.

2. The combination with a continuous towel dispensing cabinet, of a continuous towel mounted therein and having a portion thereof presented exteriorly of said cabinet, said towel having thereon a diagonally positioned index whereby the quantity of undispensed portion of said towel may be indicated by the position of the said index upon the exteriorly presented portion of said towel.

3. The combination with a towel dispensing cabinet of the type described having storage and dispensing mechanism and a long strip of toweling arranged in said cabinet and having a visible looped portion depending therefrom, said mechanism permitting the towel to be advanced a predetermined distance upon each actuation, and a marker formed on said towel and visible on the looped portion and extending lengthwise thereon of the toweling throughout its entire length from a point adjacent one edge to a point adjacent the opposite edge whereby an attendant upon ascertaining the position of the marker with relation to either edge may determine the approximate length of towel still to be advanced.

4. The combination with a towel dispensing cabinet of the type described having storage and dispensing mechanism and a long strip of toweling arranged in said cabinet and having a visible looped portion depending therefrom, said mechanism permitting the towel to be advanced a predetermined distance upon each actuation, and a marker on the towel which is at all times visible on the depending loop of the towel whereby the amount of clean towel remaining in the machine is indicated, said marker consisting of a line formed by stitching and extending the entire length of the toweling diagonally thereof.

PHILIP A. WOOSTER.
JOHN B. WOOSTER.